Figure 1:
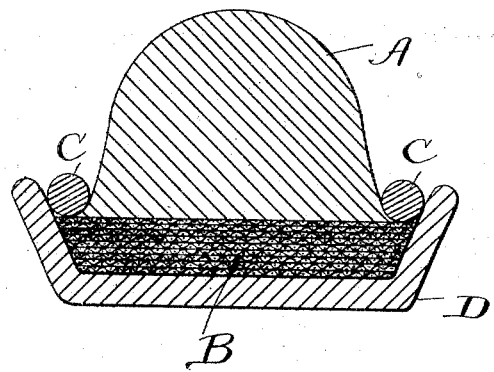

No. 777,292. PATENTED DEC. 13, 1904.
A. H. MARKS.
WHEEL TIRE.
APPLICATION FILED SEPT. 23, 1903.
NO MODEL.

Witnesses.
E. B. Gilchrist
N. L. Brennan

Inventor:
Arthur H. Marks
By his attorneys
Thurston & Bates

No. 777,292.

Patented December 13, 1904.

UNITED STATES PATENT OFFICE.

ARTHUR H. MARKS, OF AKRON, OHIO.

WHEEL-TIRE.

SPECIFICATION forming part of Letters Patent No. 777,292, dated December 13, 1904.

Application filed September 23, 1903. Serial No. 174,255. (No model.)

*To all whom it may concern:*

Be it known that I, ARTHUR H. MARKS, a citizen of the United States, residing at Akron, in the county of Summit and State of Ohio, have invented a certain new and useful Improvement in Wheel-Tires, of which the following is a full, clear, and exact description, reference being had to the accompanying drawings.

The object of the invention is to provide a very durable rubber tire for vehicle-wheels.

The invention consists of a rubber tire having a base portion made of a plurality of layers of woven-wire fabric and having a tread portion made of a resilient vulcanized-rubber compound which projects into and fills the interstices between the wires of said wire-fabric layers.

It also consists in the more specific combinations of parts shown in the drawings and hereinafter described, as pointed out definitely in the claim.

Figure 2:
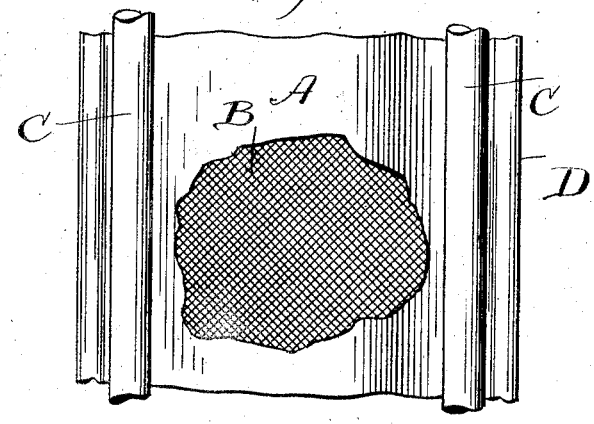

In the drawings, Figure 1 is a transverse sectional view of a tire embodying the present invention. Fig. 2 is a plan view of a section of said tire when a part of the tread portion has been cut away to show the base.

Referring to the parts by letters, A represents the tread portion of the tire, which is made of some approved rubber compound adapted for the purpose. B represents the base of said tire, which is composed of a plurality of layers of woven-wire fabric. In the construction of the tire the rubber compound of which the tread portion is composed is before it is vulcanized caused by suitable pressure to flow into and fill completely the interstices between the wires of the several wire-fabric plies. When so formed, the entire tire is vulcanized. The vulcanized rubber so filling said interstices holds the several plies together and likewise firmly holds the resilient tread portion of the tire upon the base. In the construction shown this base portion projects at its sides beyond the tread portion, and the base portion is shaped to fit a flanged wheel-rim D. C C represent wires by which the tire is fastened upon this flanged rib, the wires lying within the said flanges and resting upon the projecting edges of the base.

Having described my invention, I claim—

A rubber tire, having a tread portion and a base portion which projects at its sides beyond the tread portion, said base portion being built up for substantially its full height of a series of superimposed woven-wire fabrics, and the tread portion being made of resilient rubber compound, which projects into and fills the interstices between the wires of the base portion, all of the rubber referred to being vulcanized.

In testimony whereof I hereunto affix my signature in the presence of two witnesses.

ARTHUR H. MARKS.

Witnesses:
 A. H. NOAH,
 D. GALEHOUSE.